United States Patent [19]

Cleer, Jr.

[11] Patent Number: 4,633,821
[45] Date of Patent: Jan. 6, 1987

[54] LIQUID HEATING APPARATUS

[76] Inventor: Clarence W. Cleer, Jr., RD #2, Box 90, Kane, Pa. 16735

[21] Appl. No.: 174,456

[22] Filed: Aug. 1, 1980

[51] Int. Cl.⁴ .............................................. F23B 7/00
[52] U.S. Cl. .............................. 122/155 A; 122/20 B; 122/44 A; 126/364; 126/365
[58] Field of Search ............... 122/155 A, 44 A, 20 B; 126/116 R, 364, 365; 165/180, 133; 110/203, 216, 344

[56] References Cited

U.S. PATENT DOCUMENTS

| | | |
|---|---|---|
| 950,516 | 3/1910 | Sawtelle . |
| 983,912 | 2/1911 | Lovekin . |
| 1,107,534 | 8/1914 | Lovekin ............................. 122/20 B |
| 1,211,858 | 1/1917 | Johnson . |
| 1,938,441 | 12/1933 | Ruesch . |
| 1,983,843 | 12/1934 | Eisinga . |
| 2,307,600 | 1/1943 | Munters et al. . |
| 2,998,806 | 9/1961 | Tramontini . |
| 3,231,014 | 1/1966 | Koenig ............................. 165/180 X |
| 3,944,136 | 3/1976 | Huie ................................. 126/116 R |
| 4,054,174 | 10/1977 | Haller .......................... 122/DIG. 13 |
| 4,090,474 | 5/1978 | Kauffmann ........................ 122/20 B |
| 4,157,706 | 6/1979 | Gaskill ............................. 122/155 A |
| 4,289,730 | 9/1981 | Tomlinson ...................... 110/203 X |

OTHER PUBLICATIONS

HydroTherm Inc. brochures, "Form No. PR50-180", and Form No. A1-379, for Hydropulse furnace.
Gordon-Ray brochure by Roberts Gordon Appliance Corporation, ©1978.
Popular Science, vol. 215, No. 5, Nov. 1979, pp. 3, 60, 62, 65, 158, 160, 162 & 164.

Primary Examiner—Edward G. Favors
Attorney, Agent, or Firm—Cushman, Darby & Cushman

[57] ABSTRACT

Apparatus is provided for heating liquid, utilizing a power burner for burning a combustible fuel. Elongated pipes comprising a flue and a water jacket extend horizontally from the power burner, the flue and water jacket being long enough so that at least some of the exhaust products of combustion exiting through the flue are cooled below the dew point of water so that the latent heat of vaporization from these exhaust products is transferred to the water circulating in the water jacket. A baffle is disposed within the interior of the flue for effecting gas turbulence to maximize heat transfer. The end of the flue remote from the burner has a glass lining to prevent corrosion of the flue from condensate formation, and a condensate drain is provided. The drain includes a U-tube with limestone chips or the like disposed therein for neutralizing condensate flowing through the U-tube. Spaced C-shaped components partially surround the flue and function to space the water jacket from the flue and provide a water baffle. A tubular coil of heat-conductive material is disposed in an enlarged portion of an exhaust conduit extending from the flue, and is connected up to the domestic hot water supply to obtain further heat recovery from the exhaust gases. Efficiencies of greater than 90% can be obtained.

13 Claims, 9 Drawing Figures

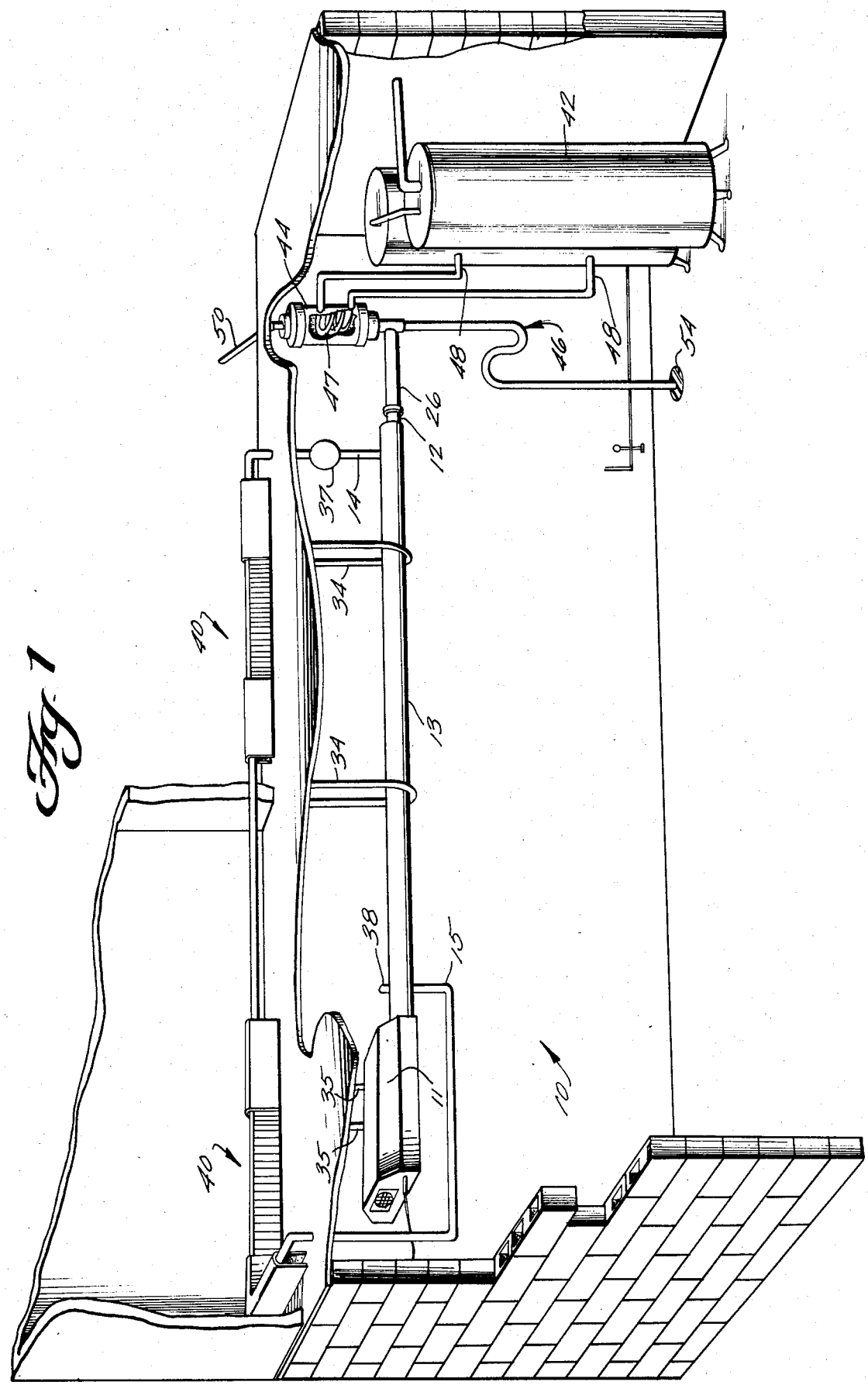

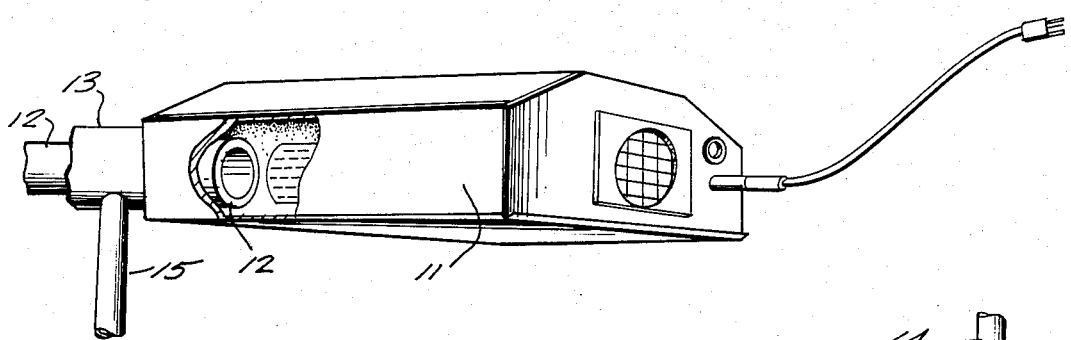
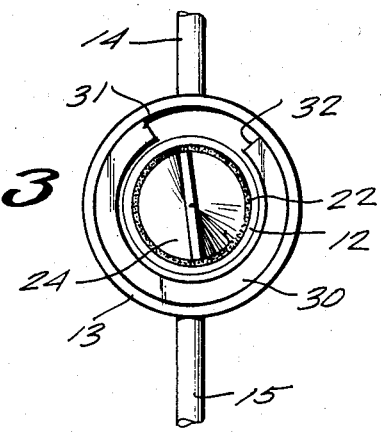
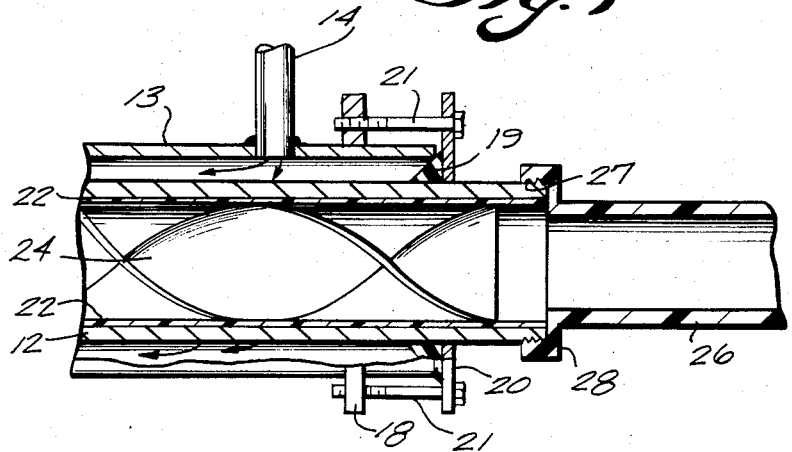
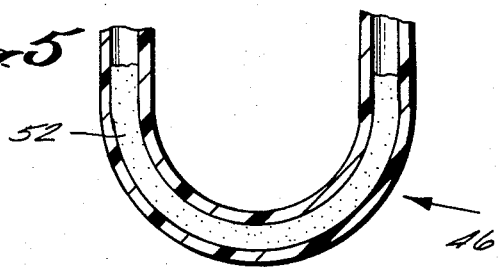

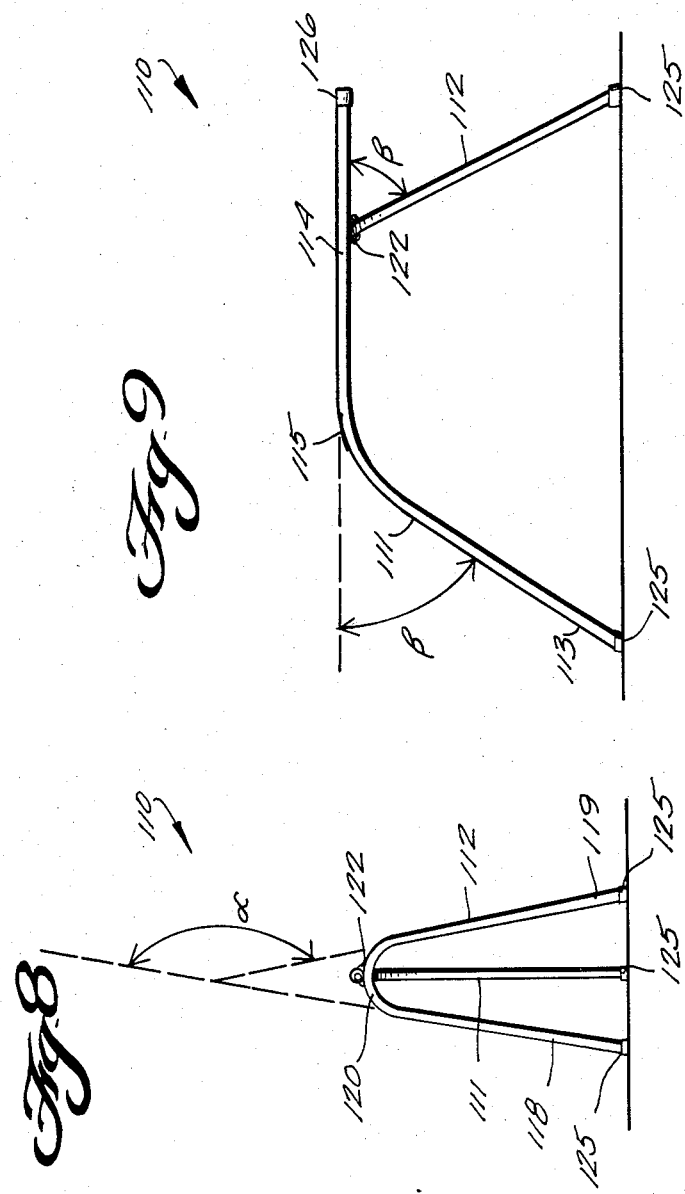
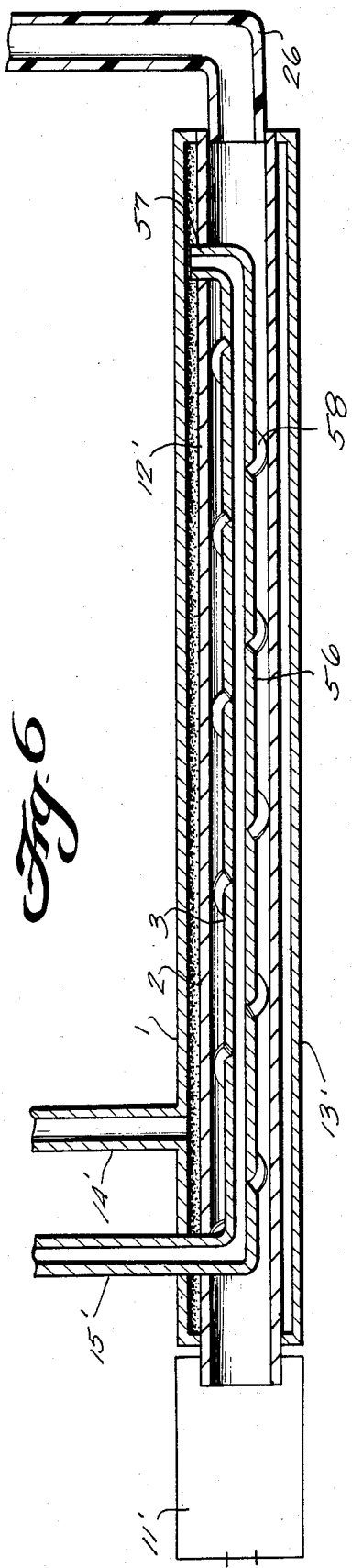
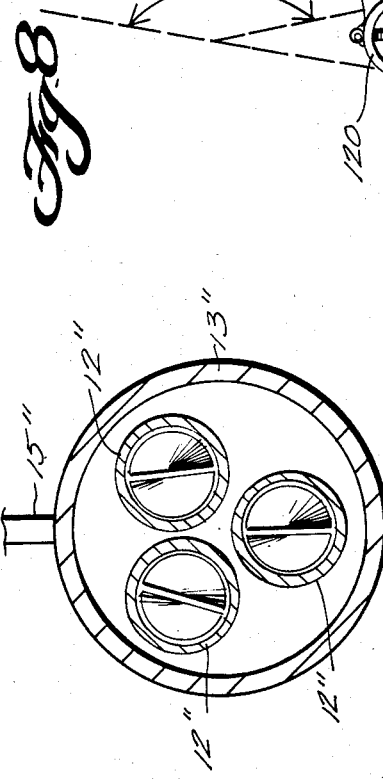

LIQUID HEATING APPARATUS

BACKGROUND AND SUMMARY OF THE INVENTION

With the decreasing availability of fossil fuels, it becomes more and more important to maximize the efficiency of all systems utilizing such fuel. In building heating systems, this is particularly important since conventional furnaces and boilers operate at efficiencies somewhere between 40 and 65%. Recent legislation in the United States has mandated seasonal-efficiency standards for fossil fuel furnaces, and numerous attempts have been made to maximize furnace and boiler efficiencies to achieve such standards.

A summary of prior and ongoing attempts to maximize furnace efficiencies is provided in *Popular Science*, Volume 215, No. 5, November, 1979, pages 60, 62, 65, 158, 160, 162, and 164. As described in that article, some attempts are being made to maximize efficiency utilizing condensing furnaces, which extract some of the latent heat of vaporization from the furnace exhaust products. Presently available condensing furnaces are extremely efficient, however they are also quite expensive.

According to the present invention, an apparatus is provided which extracts the latent heat of vaporization from at least some of the exhaust products of combustion exiting a power burner for burning a combustible fuel, which apparatus is extremely simple to construct and maintain, and is inexpensive compared to presently existing condensing systems. The apparatus according to the present invention also is capable of location in previously wasted space within a home, and therefore maximizes the amount of interior space available for other purposes within a home. For instance, the apparatus according to the present invention may be located in a crawl space, or may be hung from a basement ceiling or the like.

Apparatus according to the present invention includes a powered burner and elongated flue extending outwardly from the power burner. At least one elongated tubular member is generally concentric with the flue and comprises a component part of means for circulating liquid adjacent the flue from an inlet to an outlet (the outlet being adjacent the end of the flue adjacent the burner) so that the temperature of at least some of the exhaust products of combustion exiting the flue are cooled below the dew point, so that the latent heat of vaporization from the exhaust products is transferred to the circulating liquid. The liquid circulation means preferably comprises a single elongated tubular member surrounding the flue. Water enters an inlet adjacent the end of the tubular member remote from the burner, and is circulated to an outlet adjacent the burner. The flue is preferably a steel or cast iron pipe with a helical baffle slidably disposed within it, and readily removable form it. Corrosion preventing means are formed on at least the interior end of the flue remote from the burner to prevent corrosion from the action of condensate that will be formed within the flue. The end of the elongated tubular member is capped by a structure that will not destroy the corrosion preventing coating formed in the flue, and a plastic (e.g., CPVC) exhaust pipe may extend away from the flue.

According to another aspect of the present invention, heat recovery apparatus is associated with the exhaust conduit from the apparatus described above, or with other condensing systems, such as a system sold under the trademark HYDROPULSE, manufactured by Hydrotherm, Inc. of North Vale, N.J. A flue extends from the condensing furnace, and an exhaust conduit, including an enlarged portion, extends from the flue. Heat-conductive means are provided for circulating liquid within the exhaust conduit enlarged portion so that heat from gas flowing in the exhaust will be transferred to the circulating liquid. The enlarged portion of the exhaust conduit preferably comprises a vertically extending tubular member, and a condensate drain is located in association with the bottom of the tubular member. The heat-conductive means preferably comprises a tubular coil, preferably one that will not be corroded by exposure to the condensate. For instance, the coil may be metal with a ceramic exterior coating, or may be plastic with conductive particles formed in the plastic. This structure preferably is connected up to the domestic hot water supply tank of a dwelling containing the condensing furnace, and maximizes the heat recovery from the exhaust products of the condensing furnace.

In condensing systems, obviously a condensate is formed. Normally the condensate includes nitric acid, which is formed by combustion within the furnace with an excess of air. Before sewering the condensate, it is highly desirable to neutralize it first. Means for neutralizing the condensate preferably include a U-tube having legs thereof vertically extending, with a porous solid material (such as limestone chips) disposed within the U-tube. This construction retains the condensate a relatively long period of time in order to enhance neutralization, and additionally prevents exhausting of gas through the condensate drain.

It is the primary object of the present invention to provide a simple, inexpensive efficient arrangement for extracting the heat value of combustible fuels. This and other objects of the invention will become clear from an inspection of the detailed description of the invention, and from the appended.

BRIEF DESCRIPTION OF THE DRAWINGS

FIG. 1 is a schematic perspective view of exemplary apparatus according to the present invention shown mounted in a dwelling basement;

FIG. 2 is a detail perspective view, with portions cut away for clarity, illustrating the power burner and the portion of the flue interconnected thereto from the apparatus of FIG. 1;

FIG. 3 is an end view, with all end terminating structures removed, looking into the pipes of the apparatus of FIG. 1 from the ends thereof remote from the power burner;

FIG. 4 is a view partly in cross-section and partly in elevation taken at the ends of the pipes remote from the power burner;

FIG. 5 is a detail cross-sectional view illustrating the U-tube condensate drain of the apparatus of FIG. 1;

FIG. 6 is a schematic cross-sectional view illustrating an alternative embodiment of the flue and water conducting tubes from that of FIG. 1;

FIG. 7 is a schematic cross-sectional view illustrating yet another manner in which the tubes in the apparatus according to the present invention may be aligned;

FIG. 8 is an end view of an exemplary sawhorse that may be utilized for mounting the apparatus of FIG. 1, or any other objects; and FIG. 9 is a side view of the sawhorse of FIG. 8.

DETAILED DESCRIPTION OF THE DRAWINGS

Exemplary apparatus for heating liquid, utilizing a combustible fuel, is illustrated generally at 10 in FIG. 1. The major components of the apparatus include a conventional power burner 11, an elongated flue 12 extending outwardly from the power burner (see FIGS. 2 through 4 in particular), and an elongated tubular member 13 generally concentric with the flue 12 and forming a component part of means for circulating liquid adjacent the flue from an inlet 14 to an outlet 15. The power burner 11 may comprise any conventional power burner, such as a burner manufactured by Roberts Gordon Appliance Corporation of Buffalo, N.Y., and sold under the trademark "GORDON-RAY". The flue 12 and tubular member 13 preferably comprise metal pipes, such as steel or cast iron pipes. The flue 12 may be a 4-inch outside diameter steel pipe with 0.125 inch wall thickness, and the pipe 13 may be a 5-inch outside diameter steel pipe with a 0.125 inch wall thickness. Both pipes would be at least 15 feet long, and preferably would be on the order of 18 to 20 feet long.

The flue 12 is of sufficient length to provide for the condensation of at least some of the exhaust products flowing therein if sufficiently cooled, and the liquid circulating means circulates liquid adjacent the flue so that that temperature of at least some of the exhaust products of combustion exiting the flue are cooled below the dew point (about 150° F.) so that the latent heat of vaporization from the exhaust products is transferred to the circulating liquid.

Since condensate will be formed in the flue 12, it is desirable to ensure that at least the portions thereof in which condensate will be formed (normally about the third of the flue 12 most remote from the power burner 11) will not be corroded by the action of the condensate, which normally will include nitric acid. One eminently suitable way to provide corrosion protection is to spray on a glass (ceramic) lining interiorly of a section of the flue 12, and bake it on. That section can then be welded to another section at one end thereof to provide the complete flue 12. However, at the end of the flue 12 distal from the burner 11, it is necessary to terminate the pipes 12, 13 so that the glass lining will not be destroyed (as would be the case if the components were arc welded at that point). A typical manner for terminating of the tubular member 13 to seal the volume between the flue 12 and the tubular member 13 is illustrated in FIG. 4. In this arrangement, an annular member 18 extends around the tubular member 13. A sealing ring 19 of resilient material (e.g., rubber) is inserted in the end of the tube 13, surrounding the flue 12, and a compression plate 20 is drawn into compressive contact with the sealing ring 19 by the bolts 21 engaging the plate 20 and annular member 18. Since the temperature of both the water at inlet 14 and the gas exiting from flue 12 at the sealing ring 19 are relatively low, conventional sealing materials can be utilized.

In FIG. 4, the glass coating on the interior of the flue 12 is illustrated generally at 22, extending to the end of the flue 12. Disposed interiorly of the flue 12 there preferably is provided a generally helical baffle 24 for effecting turbulent gas flow within the flue to maximize heat transfer between the exhaust gases in the flue and the circulating liquid. The baffle 14 may be a conventional baffle utilized in gas water heater flues. Preferably the baffle 24 is not attached to the interior of the flue 12, but merely is slidable therein. In that way, when access is gained to the end of the flue 12 remote from the burner 11, the baffle 24 may be easily withdrawn to facilitate cleaning of the flue 12.

An exhaust conduit preferably is connected to the end of the flue 12, as illustrated most clearly in FIG. 4. The exhaust conduit may comprise a piece of CPVC pipe 26. The pipe 26 may be attached to the end of the flue 12 in any manner that will not destroy the glass coating 22 in the flue 12. For example, this connection may be effected utilizing a solvent adhesive or—as illustrated in FIG. 4—the outside of the end of the flue 12 may be threaded, and that may be received by threads 27 formed on the interior of a collar 28 of pipe 26. A suitable gasket or other sealing means may be provided between the collar 28 and pipe 12 if necessary.

Since the pipes 12, 13 are very long, it is highly desirable to provide spacers at points along the length thereof. A typical spacer is illustrated in FIG. 3, and comprises a generally C-shaped member 30. In addition to spacing the pipes 12, 13, the structure 30 also functions as a liquid baffle, forcing liquid flow in the open area between the ends 31, 32 thereof. Since liquid is forced to flow in this manner at predetermined points along the length of the pipes, there is no tendency for temperature stratification of the liquid, which might otherwise occur Thus, uniform heat transfer from the flue 12 to the circulating liquid is effected.

The apparatus 10 can be mounted conveniently in places where floor space is at a premium. For instance, the apparatus 10 can be mounted in a crawl space, or may be hung from a basement ceiling (as illustrated in FIG. 1) since desirably the tubes 12, 13 are substantially horizontally disposed. In order to facilitate the draining of condensate, a gentle downward slope is provided for the flue 12 from the burner 11 to the exhaust conduit 26. Hangers 34 hang the pipes 12, 13 from the basement ceiling in the exemplary embodiment illustrated in FIG. 1, and hangers 35 hang the power burner 11 for alignment with the pipes 12, 13.

The primary use of the apparatus 10 is with a home heating system. In such an arrangement, a pump 37 circulates water through the inlet 14 into the volume between the pipes 12, 13. The water continuously increases in temperature until it exits from outlet 15. Preferably a pressure relief valve 38 is provided in pipe 13 adjacent outlet 15. From outlet 15, the water circulates through radiators 40. Alternatively, water from the outlet 15 may circulate through a heat exchanger in a forced air system, or may otherwise be utilized to provide space heating.

The efficiency of the apparatus 10 is normally greater than 90%. In order to increase the efficiency even further, it is desirable to provide a secondary heat exchanger in the low temperature exhaust gases flowing through exhaust conduit 26. These low temperature exhaust gases have enough heat remaining to pre-heat water for a domestic hot water supply tank, such as the tank 42 illustrated in FIG. 1.

Heat recovery from the exhaust conduit 26 is preferably achieved utilizing the vertically oriented tubular member 44, which comprises an enlarged portion of the exhaust conduit 26. A condensate drain 46 is connected in association with the bottom of the tubular member 44. Condensate both from flue 12 and that formed within the tubular member 44 drain into the condensate drain 46.

Disposed within the tubular member 44 are heat-conductive means for circulating water within the exhaust gas flow so that heat will be transferred from the exhaust gas to the circulating liquid. The heat-conductive means preferably comprises a tubular coil, like the tubular coil 47 illustrated schematically FIG. 1, connected by pipes 48 to the hot water tank 42 (in practice, exchanger 44 would be located to facilitate gravity flow of water from exchanger 44 to tank 42.) The coil 47 preferably is formed of a material that will not easily corrode when subjected to the condensate within the tubular member 44. For instance, the coil 47 may be formed from metal with a ceramic coating on the exterior thereof, or may be formed of plastic with conductive particles therein. Gases exhausting from the tubular conduit 44 exit the dwelling through a final plastic exhaust tube 50.

The condensate drain 46 preferably includes means for neutralizing condensate to drain therethrough. Preferably, the condensate drain 46 is formed as a U-tube, with the legs thereof extending vertically, as illustrated in FIGS. 1 and 5. The U-tube is filled with a porous solid material 52 (see FIG. 5) for neutralizing the condensate. One especially suitable material 52 is limestone chips. The U-tube arrangement maximizes the contact time between the condensate and the neutralizing agent 52, while simultaneously preventing passage of exhaust gas through the drain 46. After passing through U-tube 46, the condensate may be sewered through drain 54 (see FIG. 1).

While the preferred form of the flue 12 and tubular member 13 is illustrated in FIGS. 1 through 4, the structures may take other forms. For instance, in the embodiment illustrated in FIG. 6, the liquid circulation is provided by two tubular members, the tubular member 13' being disposed exteriorly of the flue 12', and another tubular member 56 being disposed interiorly of the flue 12', both tubes 56, 13' being concentric with the flue 12'. In this embodiment, the liquid inlet 14' and the liquid outlet 15' are both adjacent the power burner 11', and a radially extending connection 57 is provided between the tubular member 56 and the volume between the exterior tubular member 13' and the flue 12'. In this embodiment, water circulates from inlet 14' through the volume between the tubes 12', 13', through conduit 57, and through interior tube 56 to finally exit outlet 15'. A baffle 58 is provided in the volume between the pipe 56 and flue 12' to ensure gas turbulence, and the gas finally exits through plastic exhaust conduit 26'.

In the FIG. 7 embodiment, a single elongated exterior tubular member 13" is provided for a plurality of flues 12". Each flue 12" is associated with a separate powered burner, and water is circulated within the entire volume interior of tube 13" and exterior of flues 12".

FIGS. 8 and 9 show a simple, inexpensive, sturdy, and readily producible sawhorse, generally at 110. The sawhorse consists essentially of a first metal tubular member 111 having a first end 113 forming a first leg of the sawhorse, and a second end 114 forming a support portion of the sawhorse, with a bend 115 being provided between the first and second ends 113, 114. The support portion 114 is horizontal, and a plurality of the sawhorses 110 may be utilized for mounting the apparatus 10 in use or for testing. The sawhorses 110 may be utilized in any other conventional manner also.

The sawhorses 110 further consist of a second metal tubular member 112 having a first end 118 thereof forming a second leg of the sawhorse and a second end 119 forming a third end of the sawhorse, with a bend 120 being provided between the first and second ends. Means are provided, such as the weld 122, for attaching the first member support portion 114 to the second member bend 120 so that the second member ends 118, 119 extend downwardly from the support portion 114 to support, with the first leg 113, the support portion 114 in a generally horizontal position.

Preferably the tubular members 111, 112 are made from steel pipe. For instance the first member 111 may be formed from a 1-inch diameter steel pipe, and the second member 112 formed by bending a ¾-inch diameter steel pipe. The bend 115 forms an angle $\beta$ less than 90°, while the bend 120 forms an angle $\gamma$ greater than 90°. The weld 122 attaches the first and second member 111, 112 together so that a plane containing the second member ends 118, 119 makes substantially the angle $\beta$ with respect to the support portion 114, and the second members extend away from the first member first end 113. In this way the stability of the support for the sawhorse is maximized.

In order to prevent marring of surfaces with which the sawhorse might come in contact, plastic end caps 125 are placed on the ends of the legs 113, 118, and 119. A plastic end cap 126 may also be placed on the end of the support portion 114, as illustrated in FIG. 9. The sawhorse can be quickly and easily constructed from readily available components, yet is extremely sturdy and long-lasting.

Exemplary apparatus according to the present invention having been described, a typical manner of operation will now be set forth:

Operation

One end of flue pipe 12 (see FIG. 2) is connected to the power burner 11, and the baffle 24 is slid into the flue 12 through the glass coated distal end thereof. Spacers 30 are provided at predetermined points along the length of the flue 12, and the outer tube 13 is disposed around the flue 12. Inlet and outlet pipes 14, 15 are operatively connected to the tubular member 13, and rubber seal 19 is inserted in the open end of the tubular member 13 (see FIG. 4) and drawn into sealing engagement with the pipes 12, 13 by the annular member 18, compression plate 20, and bolts 21.

Exhaust conduit 26 is screw-threaded onto the end of flue 12 extending exteriorly of compression plate 20, and that is connected to condensate drain 46 and the enlarged exhaust tubular component 44. The pipes 48 extending to heat exchanger 47 are interconnected to the domestic hot water tank 42, the condensate drain 46 is disposed over basement drain 54, the inlet 14 and outlet 15 are connected up to the home radiators 40 and pump 37, and the apparatus 10 is hung from the basement ceiling by hangers 34, 35. After installation of the apparatus 10, water flow is started into inlet 14, the water passing through the openings between ends 31, 32 of the baffles 30, and to the outlet 15 and eventually to the radiators 40 to provide space heating. Combustible fuel (preferably natural gas) is burned by the power burner 11, and heat exchange is provided between the flue 12 and the water circulating in the volume between the flue 12 and the outer tubular member 13. The flue gases pass in a tortuous path defined by baffle 24, finally exiting into exhaust conduit 26 at a relatively low temperature (e.g., 250° F.), the latent heat of vaporization from at least some of the exhaust products being transferred to the circulating liquid as condensate forms in the flue 12. The coldest water (at inlet 14) is in contact with the coolest gas, and the hottest water (at outlet 15) is in association with the hottest flue gas.

The flue gases pass through exhaust conduit 26 into a secondary heat exchanger provided by the member 44 and coil 47. Further latent heat of vaporization is given up to the water circulating in the coil 47, pre-heating the domestic water supply in tank 42. The spent gas is finally exhaust through exhaust pipe 50.

Condensate formed in the flue 12 and in the exhaust member 44 drain through condensate drain 46, passing through the limestone chips 52 and being neutralized before sewering into drain 54. The apparatus 10 is capable of achieving efficiencies of greater than 90%.

While the secondary heat exchanger, provided by member 44 and coil 47, and the condensate drain 46 have been described with respect to the apparatus 10, these structures can also be utilized in conjunction with other condensing furnaces, such as those described in the aforementioned *Popular Science* article.

It will thus be seen that a simple, inexpensive, and efficient apparatus for heating liquid utilizing a combustible fuel has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for heating liquid, utilizing a combustible fuel, and comprising:
    a power burner for burning a combustible fuel;
    an elongated flue extending outwardly from said power burner, and having sufficient length to provide for the condensation of at least some of the exhaust products flowing therein if sufficiently cooled; and
    at least one elongated tubular member generally concentric with said flue and comprising a component part of means for circulating liquid adjacent said flue from an inlet to an outlet, the outlet adjacent the end of the flue adjacent said burner, so that the temperature of at least some of the exhaust products of combustion exiting through said flue are cooled below the dew point of water so that the latent heat of vaporization from said exhaust products is transferred to the circulating liquid; said liquid circulating means consisting essentially of:
    a single said elongated tubular member, said member having a cross-sectional area larger than the cross-sectional area of said flue, and surrounding said flue; an inlet to said tubular member adjacent the end thereof remote from said burner; an outlet from said tubular member; and means insuring circulation of liquid from said inlet, in the volume between said tubular member and said flue, and out said outlet; and
    wherein said flue is formed of heat conductive material;
    said flue including means formed on the interior thereof for preventing corrosion thereof from the action of condensate formed therein, said corrosion preventing means being formed along at least the length of said flue wherein condensation is likely to take place; said flue comprising a metal pipe and wherein said corrosion preventing means comprises a glass lining coating a portion of said flue;
    said apparatus further comprising sealing means sealing the volume between said flue and elongated tubular member at the end termination of said elongated tubular member remote from said power burner without destruction of the glass lining of said flue thereat; said sealing means comprising a substantially annular member extending around said tubular member adjacent said end termination thereof and rigidly affixed thereto; a sealing ring of resilient material; a compression plate; and means for drawing said compression plate against said sealing ring and toward said annular member to effect sealing between said flue and said tubular member.

2. Apparatus for heating liquid, utilizing a combustible fuel, and comprising:
    a power burner for burning a combustible fuel;
    an elongated flue extending outwardly from said power burner, and having sufficient length to provide for the condensation of at least some of the exhaust products flowing therein if sufficiently cooled; and
    at least one elongated tubular member generally concentric with said flue and comprising a component part of means for circulating liquid adjacent said flue from an inlet to an outlet, the outlet adjacent the end of the flue adjacent said burner, so that the temperature of at least some of the exhaust products of combustion exiting through said flue are cooled below the dew point of water so that the latent heat of vaporization from said exhaust products is transferred to the circulating liquid; said liquid circulating means consisting essentially of:
    a single said elongated tubular member, said member having a cross-sectional area larger than the cross-sectional area of said flue, and surrounding said flue; an inlet to said tubular member adjacent the end thereof remote from said burner; an outlet from said tubular member; and means insuring circulation of liquid from said inlet, in the volume between said tubular member and said flue and out said outlet; and
    wherein said flue is formed of heat conductive material;
    said apparatus further comprising a liquid baffle means disposed in the volume between said flue and said elongated tubular member for effecting mixing of liquid flow therebetween, and preventing temperature stratification in the flow, spacing means being disposed in the volume between said flue and said elongated tubular member for spacing the flue and tubular member at predetermined points along the lengths thereof, said liquid baffle means and spacing means comprising a plurality of generally C-shaped components partially surrounding said flue, and disposed at spaced predetermined points along the lengths of said flue and tubular member.

3. Apparatus for heating liquid, utilizing a combustible fuel, and comprising:
    a power burner for burning a combustible fuel;
    an elongated flue extending outwardly from said power burner, and having sufficient length to provide for the condensation of at least some of the exhaust products flowing therein if sufficiently cooled; and at least one elongated tubular member generally concentric with said flue and comprising a component part of means for circulating liquid adjacent said flue from an inlet to an outlet, the outlet adjacent the end of the flue adjacent said burner, so that the temperature of at least some of the exhaust products of combustion exiting through said flue are cooled below the dew point of water so that the latent heat of vaporization from said exhaust products is transferred to the circulating liquid; said liquid circulating means consisting essentially of:

a single said elongated tubular member, said member having a cross-sectional area larger than the cross-sectional area of said flue, and surrounding said flue; an inlet to said tubular member adjacent the end thereof remote from said burner; an outlet from said tubular member; and means insuring circulation of liquid from said inlet, in the volume between said tubular member and said flue, and out said outlet; and wherein said flue is formed of heat conductive material;

said flue including means formed on the interior thereof for preventing corrosion thereof from the action of condensate formed therein, said corrosion preventing means being formed along at least the length of said flue wherein condensation is likely to take place; said flue comprising a metal pipe and wherein said corrosion preventing means comprises a glass lining coating a portion of said flue;

said apparatus further comprising sealing means sealing the volume between said flue and elongated tubular member at the end termination of said elongated tubular member remote from said power burner without destruction of the glass lining of said flue thereat; said sealing means comprising a substantially annular member extending around said tubular member adjacent said end termination thereof and rigidly affixed thereto; a sealing ring of resilient material; a compression plate; and means for drawing said compression plate against said sealing ring and toward said annular member to effect sealing between said flue and said tubular member;

said at least one tubular member comprising two tubular members, one disposed exteriorly of said flue, and the other disposed interiorly of said flue, both concentric with said flue; and wherein both said liquid inlet and said liquid outlet are disposed adjacent said power burner, said water inlet being connected to said exterior tubular member, and said water outlet being connected to said interior tubular member; and a radially extending connection being provided between said interior tubular member and the volume between said exterior tubular member and said flue, said connection being adjacent the ends of said tubular members remote from said power burner.

4. Apparatus for heating liquid, utilizing a combustible fuel, and comprising:

a power burner for burning a combustible fuel;

an elongated flue extending outwardly from said power burner, and having sufficient length to provide for the condensation of at least some of the exhaust products flowing therein if sufficiently cooled; and at least one elongated tubular member generally concentric with said flue and comprising a component part of means for circulating liquid adjacent said flue from an inlet to an outlet, the outlet adjacent the end of the flue adjacent said burner, so that the temperature of at least some of the exhaust products of combustion exiting through said flue are cooled below the dew point of water so that the latent heat of vaporization from said exhaust products is transferred to the circulating liquid; said liquid circulating means consisting essentially of:

a single said elongated tubular member, said member having a cross-sectional area larger than the cross-sectional area of said flue, and surrounding said flue; an inlet to said tubular member adjacent the end thereof remote from said burner; an outlet from said tubular member; and means insuring circulation of liquid from said inlet, in the volume between said tubular member and said flue, and out said outlet; and wherein said flue is formed of heat conductive material;

said apparatus further comprising means for effecting turbulent gas flow within said flue to maximize the heat transfer between the exhaust gases in said flue and the circulating liquid; an exhaust conduit being provided extending away from said flue, and including a condensate drain at the low point of said exhaust conduit; said apparatus further comprising means for mounting said flue and said tubular member so that they extend generally horizontally, at a gentle slope downwardly from said power burner, said mounting means for comprising means for suspending said tubular member and power burner from a basement ceiling.

5. Apparatus as recited in claim 3 further comprising a baffle surrounding said interior tubular member and disposed within said flue for effecting turbulent flow of gas in said flue to maximize heat transfer between the gas and the circulating liquid.

6. Heat recovery apparatus comprising a condensing furnace, including a flue extending from said furnace;

an exhaust conduit, composed of non-heat conductive material having a melting point approximately the same as that of CPVC pipe, extending from said flue and including an enlarged portion, said exhaust conduit comprising means for receiving exhaust gases from said flue which have had the majority of the exhaust products of combustion condensed so that the latent heat of vaporization is removed therefrom; and heat conductive means for circulating liquid within said exhaust conduit enlarged portion so that heat from gas flowing in said exhaust conduit will be transferred to the circulating liquid.

7. Apparatus as recited in claim 6 wherein said enlarged portion of said exhaust conduit comprises a vertically extending tubular member; and further comprising a condensate drain located in association with the bottom of said vertically extending tubular member.

8. Apparatus as recited in claims 6 or 7 wherein said heat conductive means comprises a tubular coil, said coil constructed of a material selected from the group consisting essentially of: metal with a ceramic coating on the exterior thereof, and plastic with conductive particles formed therein.

9. Apparatus as recited in claim 6 wherein said liquid circulating means is connected up to the domestic hot water supply tank of a dwelling containing said condensing furnace.

10. Apparatus as recited in claim 6 wherein said exhaust conduit comprises CPVC plastic pipe.

11. Apparatus for heating liquid, utilizing a combustible fuel, and consisting essentially of a power burner for burning a combustible fuel;

a first metal pipe operatively connected to an exhaust from the power burner and comprising a flue extending therefrom, said first metal pipe being at least 15 feet long;

a second metal pipe having an inside diameter larger than the outside diameter of the first metal pipe, and mounted in surrounding relationship therewith substantially the entire length thereof, said second metal pipe being at least 15 feet long;

a helical baffle disposed within said first metal pipe for generating turbulence in gas flowing within the first metal pipe;

means for circulating liquid within the volume between the first and second metal pipes to flow from an inlet adjacent the ends of the pipes remote from said power burner, to an outlet adjacent the ends of the pipes adjacent said power burner; and means for mounting said burner and said pipes so that said pipes extend generally horizontally.

12. Apparatus as recited in claim 11 further comprising means for connecting up said inlet and said outlet to a home heating system.

13. Apparatus as recited in claim 11 in combination with a plurality of power burners and a plurality of said first pipes, and wherein said second metal pipe receives all of said first metal pipes therewithin.

* * * * *